April 8, 1941.  W. R. COLLINGS ET AL  2,238,013
COATING PROCESS
Filed July 24, 1939   2 Sheets-Sheet 2
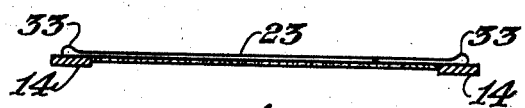
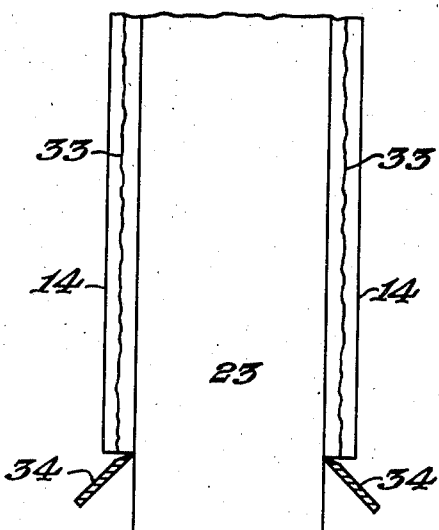
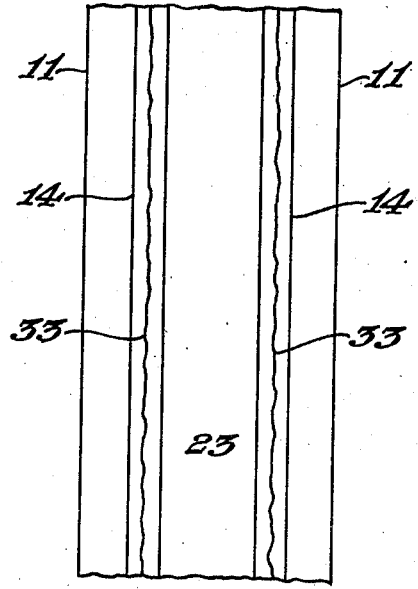
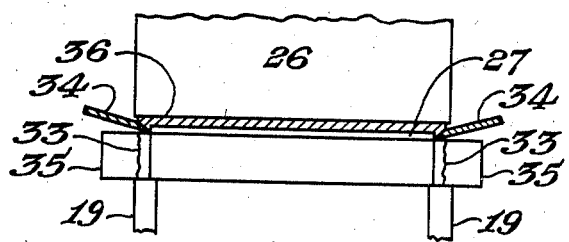
INVENTORS
William R. Collings
BY Harry W. Bull
Griswold & Burdick
ATTORNEYS Patented Apr. 8, 1941

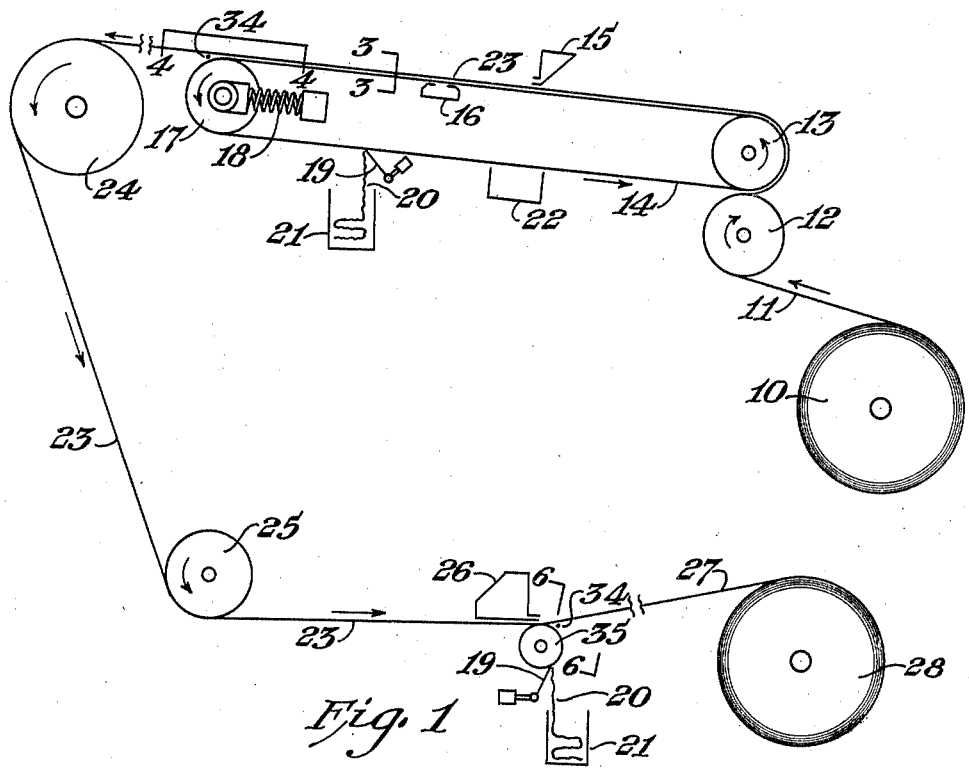
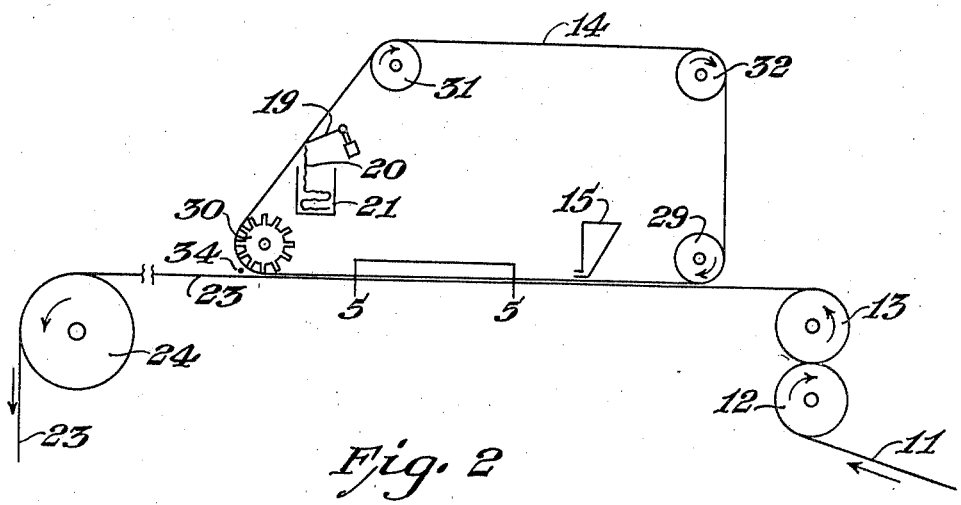

2,238,013

UNITED STATES PATENT OFFICE 2,238,013

COATING PROCESS

William R. Collings and Harry W. Bull, Midland, Mich., assignors to The Dow Chemical Company, Midland, Mich., a corporation of Michigan Application July 24, 1939, Serial No. 286,161

4 Claims. (Cl. 91—68)

This invention relates to a method of eliminating edge bead formation during the casting of films and the coating of paper. It also concerns a method of applying a uniform width of smooth beadless coating to paper or other surfaces suitable for receiving films.

It is common practice when coating paper or when casting films to employ viscous solutions of coating compositions in volatile solvents. Such solutions may be applied to the paper or other surface on which the film is to be formed by extrusion under superatmospheric pressure from a thin slit in a hopper positioned above a moving sheet of paper or a moving belt of sufficient smoothness for film casting operations. The viscous solution, as it is extruded from the hopper, forms a web which, when deposited on the moving support, forms a coating band, the edges of which are beaded due to the high surface tension of the solution which comes into play while the web of coating composition is passing in the air from the hopper slot to the coating surface. The lateral beads or ridges herein referred to as "edge beads" give an unsightly appearance to the coated material, and the finished article is of irregular thickness particularly along its edges.

In the case of coated paper where the beads occur near the two edges of the coated sheet, they have heretofore been trimmed off by slitting the paper longitudinally inside the beaded margins. This is believed to be an unnecessary waste of expensive coating material and paper. In those cases where it is desired to apply a uniform width of coating on a paper sheet and where the edges of the coating do not all lie at the edges of the said sheet, it has heretofore been impossible to eliminate bead formation when using the preferred viscous coating compositions. Sheets with beaded edges cannot be employed satisfactorily as printing surfaces since most printing presses are adjusted for operation on the assumption that the printing surface will be a substantially perfect plane. The use of paper coated prior to printing has thus been limited to papers of sufficient width so that they can be trimmed to eliminate edge beads and still leave the desired printing area.

It is accordingly among the objects of the invention to provide a method whereby viscous coating compositions may be applied to paper without waste of paper or employed in the casting of films in a manner such that edge beads are eliminated from the finished article. It is another object to provide a method of applying a uniform width of smooth beadless coating to paper. It is a further object to provide a method of casting a beadless film of coating composition on a film casting bed. Other objects and advantages of the invention will become apparent from the following specification.

To the accomplishment of the foregoing and related ends, the invention, then, consists of the method hereinafter fully described and particularly pointed out in the claims, the annexed drawings and the following description setting forth in detail certain modes of carrying out the invention, such disclosed modes illustrating, however, but some of various ways in which the principles of the invention may be used.

In the said drawings:

Fig. 1 is a diagrammatic side elevation of an apparatus for carrying out the invention.

Fig. 2 is a side elevation of an apparatus whereby another modification of the invention may be carried out.

Fig. 3 is a cross sectional elevation taken along lines 3—3 in Fig. 1.

Fig. 4 is a plane section taken along lines 4—4 of Fig. 1.

Fig. 5 is a plane section taken along lines 5—5 of Fig. 2.

Fig. 6 is a vertical cross section taken along the lines 6—6 of Fig. 1.

A method has now been found whereby waste of coating composition may be eliminated and smooth beadless coatings may be applied, for example, to paper so that the coated articles will have the aforesaid desired characteristics of uniformity of coating. The method of the invention comprises the steps of extruding under pressure from a suitable hopper a web of a viscous solution of a coating composition toward the surface of a moving sheet of paper or similar moving flexible support. The extruded web, according to the invention, is of a width greater than that required to cover the desired portion of the moving support. There is provided on each side of the portion of the moving flexible support to be coated, and substantially in the same plane therewith a separate moving support or tape traveling at the same rate as is the surface on which the coating composition is deposited. The beaded edges of the film overlap onto the lateral moving tapes. After the coating composition has been applied to the principal moving support, such as paper or a film casting belt, the lateral separate tapes follow a path which diverges from the path of the main coated support, thereby stripping the uneven beaded edge of coating composition from the casting plane without cutting or otherwise destroying the continuity of coating on the desired width of the moving flexible support.

Reference will now be had to the accompanying drawings wherein the invention is illustrated with respect to the coating of paper. From a supply roll 10, a sheet of paper 11 is unwound and passed around the feed or bite rollers 12 and 13, thence beneath a hopper 15 or other suitable supply of viscous coating composition solution. As the paper passes around roller 13, laterally disposed tapes or strips are brought alongside the moving sheet and are moved substantially in the same plane and at the same rate of linear travel as the sheet of paper being coated. If desired, suction may be applied to the under side of the freshly coated sheet to withdraw air bubbles and to increase the adhesion between the coating composition and the paper. This may be effected by applying vacuum to a slotted plate 16 located as illustrated immediately beneath the paper and just beyond the point at which the coating solution is applied thereto. The tapes 14 then diverge from the coating plane and pass around roller 17 which maintains the tape under tension by means of spring tension device 18 or its equivalent. The web of coating solution applied from hopper 15 is wider than the paper to be coated. It is deposited, therefore, not only on the paper but also in part at least upon the lateral metal strips 14. Edge beads formed during or as a result of the coating operation are located not on the paper but on the traveling lateral metal strips. As the paper and metal tape reach the point at which their paths diverge, the edge bead and any excess width of coating separate from coated paper 23 and, while the tape is being returned around roller 17 and thence back to roller 13, this excess coating material 20 is stripped from the tape by scraper blade 19 held in constant contact with the moving tape. The edge bead 33 and accompanying excess coating material 20 may be caught as in a receptacle 21 and subsequently redissolved to be returned to the supply of coating composition in hopper 15. After tape 14 passes scraper blade 19, it may be further cleaned by passing over a box 22 where it rubs across a sponge containing solvent for the particular coating material employed. If the stripping and scraping operations effected by blade 19 are carried out while the coating is still relatively fresh, the washing operation indicated as taking place in zone 22 may be dispensed with. The once-coated paper 23, after diverging from the path of the accompanying metal tapes 14, may be passed through a drying zone (indicated by a break), thence around rollers 24 and 25, thus exposing a new upper face of uncoated paper. A coating may be applied to the second side of the sheet in a manner similar to that described above by extruding a viscous coating composition solution 36 from hopper 26.

A second mode of removing edge beads and excess coating which may have been lapped over the edges of the paper is illustrated in Fig. 1 at the point where the paper passes extrusion hopper 26. Instead of the metal tapes illustrated in the upper portion of Fig. 1, there may be employed a roller 35 of small diameter extending to some distance at each side of the sheet of paper being coated. The coating composition 36 is deposited over the entire area of the sheet and allowed to overlap onto the roller 35 from which the edge bead 33 and overlapping coating are scraped by a blade 19 and collected in receptacle 21 as previously suggested. The twice-coated sheet 27 may then be dried and wound onto a roll 28.

It has been found that, at the points of divergency of the coated paper from the accompanying tape or from the roller onto either of which coating composition has been overlapped, it is desirable to hold in fixed position a stylus 34 or other fine pointed instrument to insure a clean line of cleavage between the coated paper and the excess coating composition.

In many instances, it may be desired to coat only a portion of the surface of a moving sheet of paper, leaving a predetermined margin of uncoated paper on each side. A means for accomplishing this result while preventing the deposition of edge beads on the coated surface is illustrated in Fig. 2 wherein the moving tape 14 is disposed above the sheet of paper to be coated and defines the edge of the desired width of coating. The solution extruded from hopper 15 covers the entire desired area of the sheet of paper 11 and overlaps onto strips 14 as described above. When the point of divergency of the coated paper 23 and tape 14 is reached, the tape is removed upward by passing around a toothed or cogged wheel 30. Thereafter the edge bead 33 and excess coating composition 20 are stripped from the tape by blade 19 and received in a receptacle 21 as before. The tapes are returned to the paper after passing around guide rollers 31, 32 and 29. A toothed wheel 30 is preferable to a solid surfaced roller at the point illustrated, since the surface of the tape with which this wheel comes in contact is that upon which the edge bead and other excess coating has been deposited, and a solid roller may soon become fouled with the coating composition.

The above-described method may be employed for applying beadless coatings to any moving flexible support, whether for coating the whole or a portion of the width of the said support, or for the preparation of a film which may be stripped from the support as a continuous, smooth and beadless pellicle.

Coating compositions which may be employed are any of the extrudable viscous solutions of coating materials dissolved in volatile solvents and capable of forming continuous films or of coating paper. Such coating materials include the cellulose derivatives, e. g. ethyl cellulose and cellulose acetate, or the polyvinyl resins, and the like.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. The method which comprises extruding under pressure a viscous solution of a coating composition onto a moving flexible support, to cover the width of the support which it is desired to coat and to overlap onto other moving supports, disposed laterally to the said desired width and moving in the same direction and at the same rate as the principal support to be coated, thereby to deposit excess coating on the said laterally disposed supports, and, after the coating has been deposited, moving the said laterally disposed supports in a path divergent from the path of the principal coated support, while maintaining in fixed positional relationship to the principal and lateral supports at the point of divergency of these supports an instrument adapted to cleave the laterally deposited edge bead and excess coating material from the coating on the principal support, thereby to separate said excess coating and edge bead from the principal film and to form a smooth beadless film on the desired width of the said principal flexible support.

2. The method which comprises extruding under pressure a viscous solution of a coating composition onto a moving flexible support, to cover the said support and to overlap onto other moving flexible supports disposed laterally to and in the same plane with the first said moving support and moving in the same direction and at the same rate as the principal support to be coated, thereby to deposit any excess coating and edge bead on the said laterally disposed supports and, after the coating has been applied, moving the said laterally disposed supports downward in a path divergent from the path of the principal coated support, while maintaining in fixed positional relationship to the principal and lateral supports at the point of divergency of these supports an instrument adapted to cleave the laterally deposited edge bead and excess coating material from the coating on the principal support, thereby to separate said excess coating and edge bead from the principal film and to form a smooth beadless film on the desired width of the said principal flexible support.

3. The method which comprises extruding under pressure a viscous solution of a coating composition onto a moving flexible support, to cover the width of the support which it is desired to coat less than the total width of said support and to overlap onto other moving flexible supports, disposed laterally to the said desired width and moving in the same direction and at the same rate as the principal support to be coated, thereby to deposit excess coating on the said laterally disposed supports, and, after the coating has been deposited, moving the said laterally disposed supports upward in a path divergent from the path of the principal coated support, while maintaining in fixed positional relationship to the principal and lateral supports at the point of divergency of these supports an instrument adapted to cleave the laterally deposited edge bead and excess coating material from the coating on the principal support, thereby to separate said excess coating and edge bead from the principal film and to form a smooth beadless film on the desired width less than the total width of the said principal flexible support.

4. The method as claimed in claim 1, wherein the support to be coated is paper.

WILLIAM R. COLLINGS.
HARRY W. BULL.